(12) United States Patent
Kitano et al.

(10) Patent No.: US 8,507,069 B2
(45) Date of Patent: Aug. 13, 2013

(54) LAMINATED PLATE

(71) Applicant: Meiwa Industry Co., Ltd., Atsugi (JP)

(72) Inventors: Sen Kitano, Iida (JP); Hiroyuki Kiuchi, Iida (JP); Ichiro Yuzawa, Nagano (JP); Kohsei Nozawa, Iida (JP)

(73) Assignee: Meiwa Industry Co., Ltd., Atsugi-shi (JP)

( * ) Notice: Subject to any disclaimer, the term of this patent is extended or adjusted under 35 U.S.C. 154(b) by 0 days.

(21) Appl. No.: 13/686,066

(22) Filed: Nov. 27, 2012

(65) Prior Publication Data

US 2013/0089693 A1   Apr. 11, 2013

Related U.S. Application Data

(62) Division of application No. 12/593,788, filed as application No. PCT/JP2008/055329 on Mar. 21, 2008, now Pat. No. 8,343,610.

(30) Foreign Application Priority Data

Mar. 30, 2007   (JP) ................................. 2007-095007

(51) Int. Cl.
*B32B 3/02*   (2006.01)

(52) U.S. Cl.
USPC .............. 428/76; 428/71; 428/73; 428/304.4; 428/174; 428/178; 428/57

(58) Field of Classification Search
USPC .................... 428/76, 71, 73, 304.4, 174, 178, 428/57
See application file for complete search history.

(56) References Cited

U.S. PATENT DOCUMENTS

| | | | |
|---|---|---|---|
| 5,789,057 | A | 8/1998 | Naitou et al. |
| 6,331,028 | B1 | 12/2001 | O'Neill et al. |
| 6,403,195 | B1 | 6/2002 | Montagna et al. |
| 6,406,078 | B1 | 6/2002 | Wycech |
| 7,592,059 | B2 | 9/2009 | Lane et al. |
| 2007/0269645 | A1 | 11/2007 | Raghavendran et al. |

FOREIGN PATENT DOCUMENTS

| | | |
|---|---|---|
| CN | 2190017 Y | 2/1995 |
| JP | 6-238783 A | 8/1994 |
| JP | 8-323842 A | 12/1996 |

(Continued)

OTHER PUBLICATIONS

International Preliminary Report on Patentability, PCT/JP2008/055329, Oct. 22, 2009, 9 pgs.

*Primary Examiner* — Hai Vo
(74) *Attorney, Agent, or Firm* — Foley & Lardner LLP

(57) ABSTRACT

A vehicle deck board 1 is molded in such a manner that a lower die 21 and an upper die 22 are clamped together in a state where foamed resins 13 and reinforcements 20 are interposed between a back surface side sheet material 16 and a front surface side sheet material 15, whereby the back surface side sheet material 16 and the front surface side sheet material 15 are welded to each other to thereby form a laminated member 26 with height-increasing bridge members included therein, compressed air is injected into an inside of the laminated member 26 with the height-increasing bridge members included therein, which is formed by welding the back surface side sheet material 16 and the front surface side sheet 15, while individually vacuum-sucking the back surface side sheet material 16 and the front surface side sheet material 15 to the lower die 21 and the upper die 22, and the laminated member 26 concerned is subjected to blow molding.

15 Claims, 9 Drawing Sheets

(56) References Cited

FOREIGN PATENT DOCUMENTS

| | | |
|---|---|---|
| JP | 8-336863 A | 12/1996 |
| JP | 10-80982 A | 3/1998 |
| JP | 10-315362 A | 12/1998 |
| JP | 2000-218682 A | 8/2000 |
| JP | 2000-219100 A | 8/2000 |
| JP | 2000-289100 A | 10/2000 |
| JP | 2001-269995 A | 10/2001 |
| JP | 2002-28997 A | 1/2002 |
| JP | 2002-139193 A | 5/2002 |
| JP | 2006-182208 A | 7/2006 |
| JP | 2006-188023 A | 7/2006 |
| JP | 2006-334801 A | 12/2006 |

…

LAMINATED PLATE

CROSS-REFERENCE TO RELATED PATENT APPLICATIONS

This application is a divisional application of U.S. application Ser. No. 12/593,788, filed Sep. 29, 2009, which is the National Stage application of International Application No. PCT/JP2008/055329, filed Mar. 21, 2008, which claims priority to Japanese Application No. 2007-095007, filed Mar. 30, 2007. All of which are hereby incorporated by reference in their entirety.

TECHNICAL FIELD

The present invention relates to a laminated plate and a manufacturing method thereof.

BACKGROUND ART

Heretofore, as disclosed in Japanese Patent Laid-Open Publication No. 2006-182208, a vehicle interior panel and a molding method thereof have been known as a laminated plate and a manufacturing method thereof. In the molding method, a parison made of a thermoplastic is extruded from an extrusion head, the parison concerned is suspended between one of metal dies and the other metal die, a skin sheet is arranged between the parison and the one metal die, the metal dies are clamped together, and a pressurized fluid is introduced into the parison to perform blow molding for the parison.

However, in such a conventional technology, an inside of the vehicle interior panel is hollow, and there has been a problem that strength of the vehicle interior panel is weak. Accordingly, it is necessary to enhance the strength of the vehicle interior panel by inserting a bridge member into the inside of the vehicle interior panel. However, in the above-described conventional technology, since the bridge member cannot be inserted in advance into the inside of the vehicle interior panel, it is necessary to do work of notching a part of the vehicle interior panel after the vehicle interior panel is molded, inserting the bridge member into the inside of the vehicle interior panel, and thereafter closing such a notched portion again. This work has been cumbersome.

Moreover, in the above-described conventional technology, the vehicle interior panel is molded only by clamping the metal dies together and being blow-molded, and accordingly, a shape cannot be imparted to the vehicle interior panel so that the vehicle interior panel can go along inner surface shapes of the metal dies, and it has been apprehended that distortion may occur on a surface of a panel base material of the vehicle interior panel.

Furthermore, in the above-described conventional technology, an upper portion of the parison is pulled and extended owing to self weight of the parison as the parison is being suspended. Accordingly, there have been problems that upper and lower portions of the panel base material differ from each other in thickness, resulting in a strength difference of the panel among portions thereof, and in an occurrence of the distortion caused by the fact that the vehicle interior panel is cooled after being molded and that a temperature is changed during use of the panel concerned. In particular, as the molded panel is being larger, the upper portion of the parison is significantly thinned. Accordingly, it can be said that such a method of suspending the parison and performing the blow molding for the hollow panel is not very suitable for the molding of a large-size panel.

In this connection, it is an object of the present invention to obtain a laminated plate capable of enhancing strength thereof and capable of suppressing the occurrence of the distortion after the laminated plate is molded regardless of a size thereof, and to obtain a manufacturing method of the laminated plate.

DISCLOSURE OF THE INVENTION

One embodiment of the invention is a manufacturing method of a laminated plate, including: a first step of heating and softening two thermoplastic resin plates molded uniformly to a predetermined thickness in advance; a second step of performing vacuum shape impartment for one of the two heated and softened thermoplastic resin plates into a shape of an inner surface of a lower metal die as one of a pair of metal dies having cavities and arranged up and down while vacuum-sucking the one thermoplastic resin plate to the lower metal die; a third step of arranging a height-increasing bridge member at a predetermined position of the one thermoplastic resin plate subjected to the vacuum shape impartment into the shape of the inner surface of the lower metal die; a fourth step of arranging the other heated and softened thermoplastic resin plate on an upper surface of the height-increasing bridge member arranged at the predetermined position; a fifth step of clamping the pair of metal dies arranged up and down while individually vacuum-sucking the metal dies, thereby performing the vacuum shape impartment for the other thermoplastic resin plate arranged on the upper surface of the height-increasing bridge member into a shape of an inner surface of the upper metal die, and at the same time, welding the two thermoplastic resin plates arranged between the pair of metal dies and the height-increasing bridge member arranged between the two thermoplastic resin plates to one another, and tearing off outer circumferences of peripheral edge portions of the two thermoplastic resin plates while welding the peripheral edge portions to each other, thereby forming a laminated member with the height-increasing bridge member included therein; a sixth step of injecting compressed air into an inside of the laminated member with the height-increasing bridge member included therein while vacuum-sucking an inside of the pair of clamped metal dies, and performing shape impartment for the laminated member with the height-increasing bridge member included therein entirely into the pair of clamped metal dies, thereby forming a hollow laminated plate with the height-increasing bridge member included therein; and a seventh step of taking out the hollow laminated plate with the height-increasing bridge member included therein from the metal dies.

In an alternative embodiment, in the third step, a reinforcing member is arranged at a predetermined position of the one thermoplastic resin plate subjected to the vacuum shape impartment into the inner surface of the lower metal die together with the height-increasing bridge member.

In an additional alternative embodiment, in the second step, the one thermoplastic resin plate is vacuum-sucked to the lower metal die together with a one-side coating material in a state where the one-side coating material is interposed between the lower metal die and the one thermoplastic resin plate.

In a still further embodiment, in the fourth step, after the other heated and softened thermoplastic resin plate is arranged on the upper surface of the height-increasing bridge member arranged at the predetermined position, an other-side coating material is arranged on an upper surface of the other heated and softened thermoplastic resin plate.

Another embodiment of the invention is a laminated plate, in which a height-increasing bridge member is interposed between two plate portions made of thermoplastic resin, and end portions of the two plate portions are welded to each other, characterized in that used as the height-increasing bridge member is at least one of a thermoplastic resin-foamed molded body, a molded body obtained by laminating a synthetic resin sheet or a synthetic resin foamed sheet between two upper and lower metal plates, an embossed shaped molded body having longitudinal wall portions, a honeycomb structure molded body having longitudinal wall portions, in which air holes are formed in the longitudinal wall portions, a grid-like structure molded body having longitudinal wall portions, in which air holes are formed in the longitudinal wall portions, a chip urethane resin molded body, a chip felt molded body, and a corrugated cardboard molded body.

Another embodiment of a laminated plate is characterized in that any of a synthetic resin material, a synthetic resin foamed material and a metal material is used as the embossed shaped molded body having the longitudinal wall portions.

A further embodiment of a laminated plate is characterized in that any of a synthetic resin material, a synthetic resin foamed material, a metal material and a paper material is used as the honeycomb structure molded body having the longitudinal wall portions, in which the air holes are formed in the longitudinal wall portions, or the grid-like structure molded body having the longitudinal wall portions, in which the air holes are formed in the longitudinal wall portions.

A still further embodiment of a laminated plate is characterized in that any of a synthetic resin material and a synthetic resin foamed material, which are subjected to punch press molding, and a synthetic resin material and a synthetic resin foamed material, which are subjected to injection molding, is used as the honeycomb structure molded body having the longitudinal wall portions, in which the air holes are formed in the longitudinal wall portions, or the grid-like structure molded body having the longitudinal wall portions, in which the air holes are formed in the longitudinal wall portions.

An additional embodiment of a laminated plate is characterized in that a reinforcing member is interposed between the two plate portions, and a part of the height-increasing bridge member protrudes so as to cover at least a part of each of both end sides of the reinforcing member in a longitudinal direction.

Another embodiment of a laminated plate is characterized in that at least one of a metal-made extrusion molded product, a synthetic resin-made extrusion molded product and a resin-made press-molded product is used as the reinforcing member.

An alternative embodiment of a laminated plate is characterized in that the two plate portions are formed of a material obtained by blending at least either one of filler and glass long fiber to polypropylene resin, and the two plate portions are different from each other in at least one of a type of the filler, a blended amount of the filler, a length of the glass long fiber, and a blended amount of the glass long fiber.

The invention may also be characterized in that a coated portion coated with a coating material is formed on an outer surface of at least one plate portion of the two plate portions.

BEST MODE FOR CARRYING OUT THE INVENTION

Figure 1:
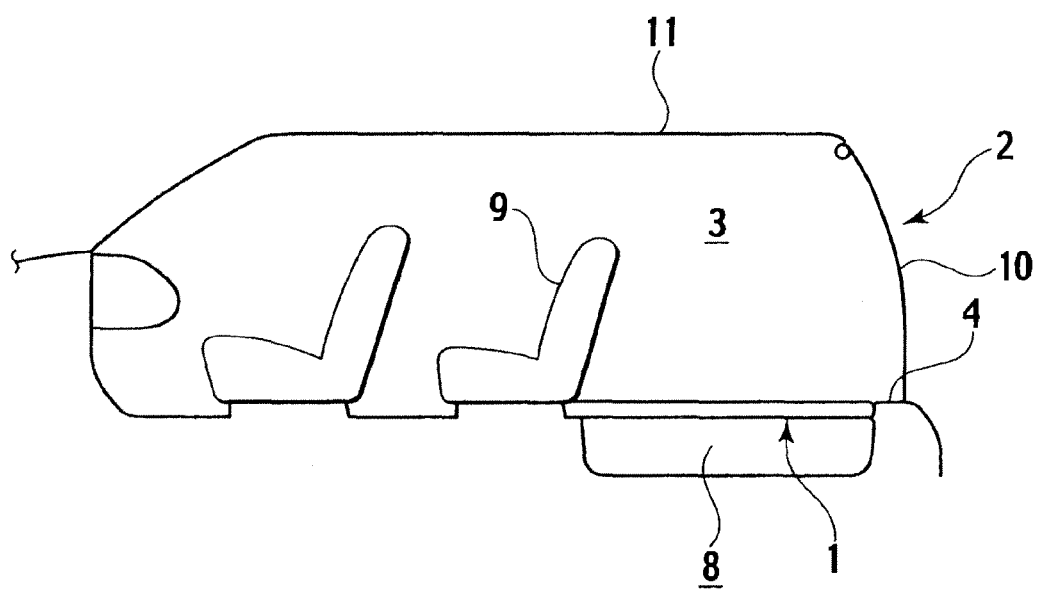
FIG. 1 is a side view showing a vehicle deck board according to an embodiment of the present invention.

A description will be made below in detail of an embodiment of the present invention while referring to the drawings. Here, a vehicle deck board is illustrated as a laminated plate.

Figure 2:
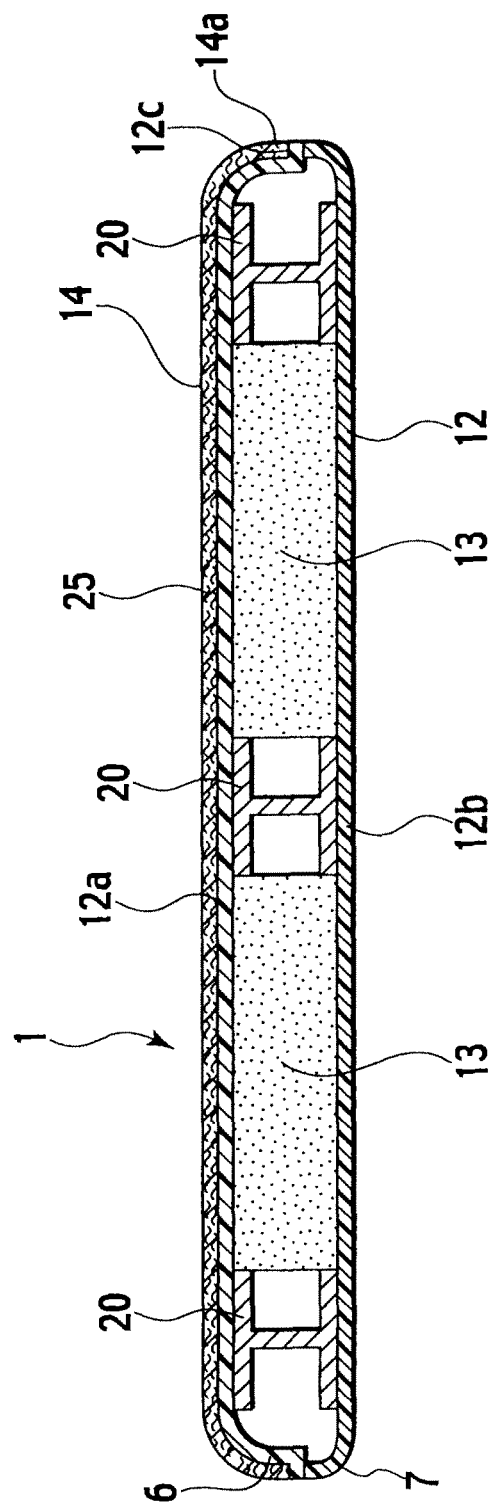
FIG. 2 is a cross-sectional view of the vehicle deck board according to the embodiment of the present invention.
Figure 3:
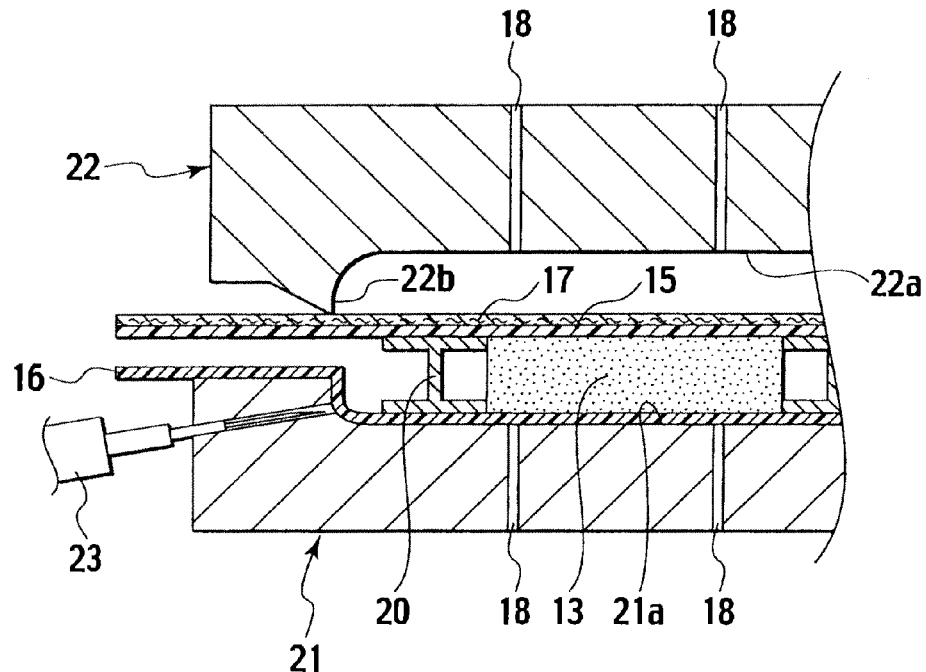
FIG. 3 is a cross-sectional view showing a state where a back surface side sheet material according to the embodiment of the present invention is vacuum-sucked to a lower die.
Figure 4:
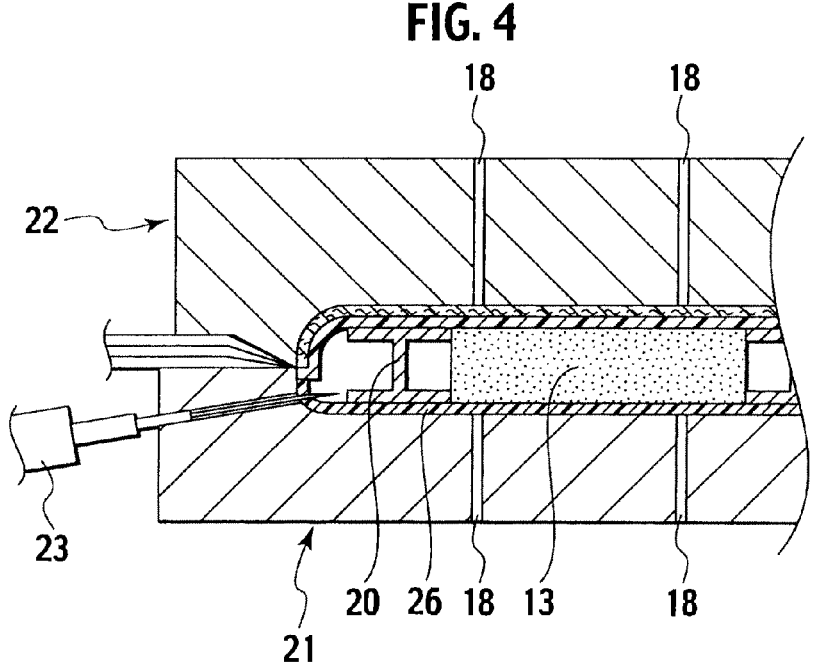
FIG. 4 is a cross-sectional view showing a state where a pair of metal dies according to the embodiment of the present invention are clamped together and front and back surface side sheet materials are blow-molded.
Figure 5:
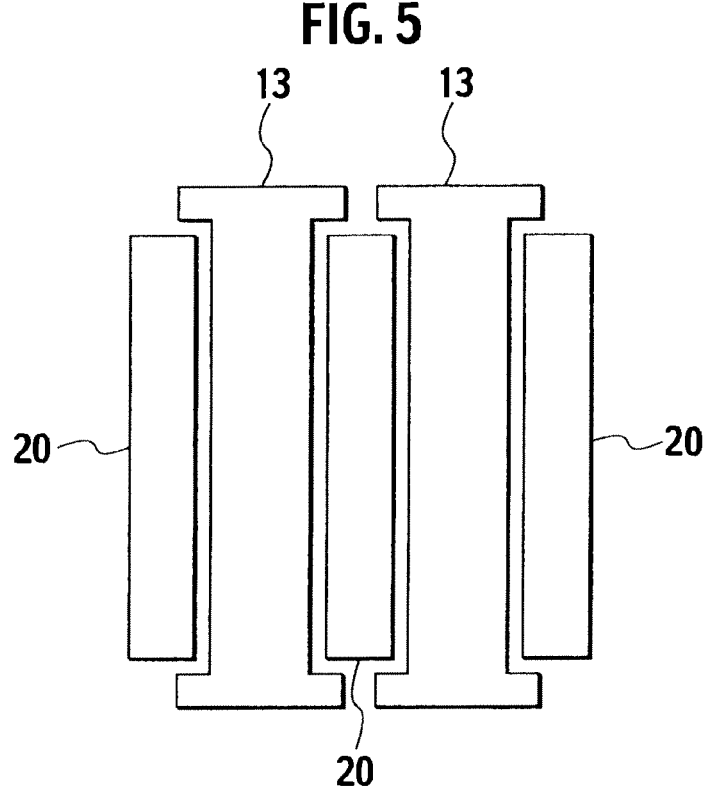
FIG. 5 is a plan view showing a state where foamed resins and reinforcements are arranged on the back surface side sheet material according to the embodiment of the present invention.

FIG. 1 is a side view showing the vehicle deck board according to this embodiment. FIG. 2 is a cross-sectional view of the vehicle deck board. FIG. 3 is a cross-sectional view showing a state where a back surface side sheet material is vacuum-sucked to a lower die, FIG. 4 is a cross-sectional view showing a state where a pair of metal dies are clamped together and front and back surface side sheet materials are blow-molded, and FIG. 5 is a plan view showing a state where foamed resins and reinforcements are arranged on the back surface side sheet material.

The vehicle deck board (laminated plate) 1 according to this embodiment is arranged on a floor 4 of a luggage room 3 of an automobile 2, and covers the floor 4 of the luggage room 3. Then, this vehicle deck board 1 is entirely rotated upward about a rotation shaft (not shown) provided on a forward end portion thereof in a vehicle fore-and-aft direction, thus making it possible to load and unload luggage in an inside of a cargo room 8 located under the floor 4. Note that the luggage room 3 is partitioned by a rear seat 9 as a front wall of the luggage room 3, a back door 10 as a rear wall thereof, and a roof panel 11 as an upper wall thereof.

The vehicle deck board 1 includes: a front surface side sheet (plate portion) 12a made of thermoplastic resin; a back surface side sheet (plate portion) 12b made of the thermoplastic resin; polypropylene-made plate-like foamed resins (height-increasing bridge members: thermoplastic resin-foamed molded bodies) 13 which are interposed between these front surface side sheet 12a and back surface side sheet 12b, and supports the front surface side sheet 12a concerned and the back surface side sheet 12b concerned; and aluminum-made reinforcements (reinforcing members: metal-made extrusion-molded products) 20 which have a substantial H shape in cross section, are interposed between the front surface side sheet 12a and the back surface side sheet 12b, and enhance rigidity of the vehicle deck board 1.

In this embodiment, filler-reinforced polypropylene obtained by blending filler (at least either one of a filler material and glass long fiber) to polypropylene is used as the individual front surface side sheet 12a and back surface side sheet 12b, and plate thicknesses of these individual sheets are the same. Moreover, in this embodiment, those in which blending ratios of the filler are the same are used as the front surface side sheet 12a and back surface side sheet 12b. Note that various materials such as silica, calcium carbonate, woody fiber, carbon fiber and glass long fiber, can be used as the filler.

Then, an end portion 6 of the front surface side sheet 12a and an end portion 7 of the back surface side sheet 12b are welded to each other in a state where the foamed resins 13 and the reinforcements 20 are interposed between the front surface side sheet 12a and the back surface side sheet 12b, whereby a hollow molded body (hollow laminated plate with the height-increasing bridge members included therein) 12 with the height-increasing bridge members included therein is formed.

Moreover, a front surface (outer surface) side of the front surface side sheet 12a is coated with a nonwoven fabric (coating material) 14. Specifically, a coated portion 25 coated with the nonwoven fabric (coating material) 14 is formed on the front surface of the front surface side sheet 12a. Note that the coated portion may be provided on a back surface (outer surface) side of the back surface side sheet 12b, or may be provided individually on the front and back surface side sheets 12a and 12b. Moreover, the coated portion does not have to be provided. Then, various materials such as olefin resin, a plastic-made corrugated cardboard and a hard board can be used as the coating material.

Furthermore, in this embodiment, at the time of welding the end portions 6 and 7 of the front surface side sheet 12a and the back surface side sheet 12b to each other, a step portion 12c is formed, and an end portion 14a of the nonwoven fabric 14 is welded to the step portion 12c concerned, whereby the end portion 14a is prevented from curing up owing to the fact that a workman, a passenger or the like touches the end portion 14a, and so on.

Moreover, in the vehicle deck board 1, the reinforcements 20 are arranged on both end and center portions thereof in the vehicle fore-and-aft direction along a vehicle width direction, and the foamed resins 13 are arranged among the reinforcements 20. Specifically, as shown in FIG. 2, the foamed resins 13 and the reinforcements 20 are alternately arranged in the vehicle fore-and-aft direction.

Next, a description will be made of a molding method of the vehicle deck board 1.
(First Step)

First, a front surface side sheet material 15 (other-side thermoplastic resin plate) 15 and a back surface side sheet material (one-side thermoplastic resin plate) 16, which are made of the thermoplastic resin and are molded uniformly to a predetermined thickness in advance, are heated and softened.
(Second Step)

Next, the back surface side sheet material (one-side thermoplastic resin plate) 16 is arranged on a lower die (lower metal die) 21. In this lower die 21, a large number of vacuum suction holes 18 for performing vacuum shape impartment for the back surface side sheet material (one-side thermoplastic resin plate) 16 are formed. Then, the back surface side sheet material 16 is subjected to the vacuum shape impartment into a shape of an inner surface 21a of the lower die 21 while being vacuum-sucked to the lower die 21. Note that the one-side coating material such as the nonwoven fabric may be interposed between the lower die 21 and the back surface side sheet material (one-side thermoplastic resin plate) 16.
(Third Step)

Next, the foamed resins (height-increasing bridge members) 13 and the reinforcements (reinforcing members) 20 are arranged at predetermined positions on the back surface side sheet material 16 subjected to the vacuum shape impartment into the shape of the inner surface 21a of the lower die 21.

Moreover, in this embodiment, as shown in FIG. 5, the foamed resins 13 individually have a shape in which both ends in the vehicle width direction are protruded in the fore-and-aft direction, that is, have a substantial I shape when viewed from the above, and the reinforcements 20 have a rectangular shape long in the vehicle width direction when viewed from the above. In this embodiment, two foamed resins 13 are arrayed fore and aft, and the reinforcements 20 are arranged on outside ends of these two foamed resins 13 and 13 and on an intermediate portion therebetween. At this time, the foamed resins 13 are arranged so as to cover at least a part of each of both ends of the reinforcements 20 in the vehicle width direction. Moreover, in this embodiment, the foamed resins 13 and the reinforcements 20 are arranged so that gaps can be formed between the foamed resins 13 and the reinforcements 20. Even if the gaps are formed between the foamed resins 13 and the reinforcements 20 as described above, the back surface side sheet material 16 and the front surface side sheet material 15 are heat-shrunk at the time of being molded, whereby the foam resins 13 and the reinforcements 20 abut against each other, and an occurrence of an unusual noise, which may be caused by the fact that the reinforcements 20 move and flatter, can be suppressed.

Note that those obtained by forming the foamed resins so that an outline shape thereof can go along an outline shape of the vehicle deck board 1 may be used as the height-increasing bridge members. Then, in the case where it is necessary to reinforce the vehicle deck board 1 by the reinforcements 20 at the time of using such foamed resins, it is suitable to notch regions of the foamed resins, in which the reinforcements 20 are arranged, and to provide groove portions and through holes in the regions concerned.

Moreover, those having various shapes can be adopted as the foamed resins. For example, the foamed resins may be arranged only in a part (for example, a front half) of the vehicle deck board 1, and a hollow portion may be provided in the other part (for example, a rear half).

(Fourth Step)

Next, the front surface side sheet material 15 (other-side thermoplastic resin plate) 15 is arranged on the foamed resins 13 and the reinforcements 20 (that is, on upper surfaces of the foamed resins 13 and the reinforcements 20), which are arranged on the back surface side sheet material 16. Specifically, the foamed resins 13 and the reinforcements 20 are interposed between the back surface side sheet material 16 and the front surface side sheet material 15. At this time, an upper die (other-side metal die) 22 is arranged above the front surface side sheet material 15. Also in this upper die 22, a large number of vacuum suction holes 18 for performing the vacuum shape impartment for the front surface side sheet material (other-side thermoplastic resin material) 15 are formed. Note that, after the foamed resins 13 are interposed between the back surface side sheet material 16 and the front surface side sheet material 15, the upper die 22 may be arranged above the front surface side sheet material 15.

Then, a nonwoven fabric material (other-side coating material) 17 is arranged so as to be interposed between the front surface side sheet material 15 and the upper die 22.

(Fifth Step)

Next, the upper die 22 and the lower die 21 are clamped together while being vacuum-sucked, whereby the nonwoven fabric material 17 and the front surface side sheet material 15, which are arranged on the foamed resins 13 and the reinforcements 20, are subjected to the vacuum shape impartment into the shape of the inner surface 22a of the upper die 22 while being vacuum-sucked to the upper die 22. At the same time, while welding and fixing the front surface side sheet material 15 and the back surface side sheet material 16, which are arranged between the upper die 22 and the lower die 21, and the foamed resins 13 and the reinforcements 20, which are arranged so as to be interposed between these front surface side sheet material 15 and back surface side sheet material 16, to each other, and welding peripheral edge portions of the front surface side sheet material 15 and the back surface side sheet material 16 to each other, outer circumferences of the peripheral edge portions thus welded are torn off by a cutting blade 22b provided on the upper die 22, whereby a laminated member 26 with the height-increasing bridge members included therein is formed. Moreover, in this embodiment, at the same time when a peripheral edge portion of the nonwoven fabric material 17 is also welded to such welded portions of the back surface side sheet material 16 and the front surface side sheet material 15, an outer circumference of the peripheral edge portion of the nonwoven fabric material 17 is also torn off by the cutting blade 22b provided on the upper die 22.

Note that, at this time, the nonwoven fabric material 17 is pasted onto a surface of the front surface side sheet material 15 by a so-called anchor effect.

(Sixth Step)

Then, while vacuum-sucking an inside of the clamped upper and lower dies (pair of metal dies) 22 and 21, that is, while vacuum-sucking the back surface side sheet material 16 and the front surface side sheet material 15 to the lower die 21 and the upper die 22, respectively, an air blow pin 23 is inserted into an inside of the laminated member 26 with the height-increasing bridge members included therein, which is welded by clamping the upper die 22 and the lower die 21 together, compressed air is injected into the inside of the laminated member 26 with the height-increasing bridge members included therein, and the laminated member 26 concerned is subjected to blow molding, whereby the hollow molded body (hollow laminated plate with the height-increasing bridge members included therein) 12 with the height-increasing bridge members included therein is formed.

(Seventh Step)

Finally, the hollow molded body 12 with the height-increasing bridge members included therein, which is thus formed, is precooled between the upper die 22 and the lower die 21, and is taken out from the upper and lower dies 22 and 21. Moreover, if the hollow molded body 12 with the height-increasing bridge members included therein, which is thus taken out, is forcibly cooled in a state of being fixed by a correction jig or the like, then heat shrinkage thereof is stopped, and it is possible to suppress an occurrence of distortion therein.

In such a way, the vehicle deck board 1 is formed.

Note that the back surface side sheet material 16 may be vacuum-sucked to the upper die 22, and the front surface side sheet material 15 may be vacuum-sucked to the lower die 21.

In accordance with this embodiment described above, while the back surface side sheet material 16 and the front surface side sheet material 15, which are molded to the uniform thickness in advance, are being vacuum-sucked to the lower die 21 and the upper die 22, respectively in a state of being arranged in the horizontal direction, the compressed air is injected into the inside of the laminated member 26 with the height-increasing bridge members included therein, which is formed by welding the peripheral edge portion of the back surface side sheet material 16 and the peripheral edge portion of the front surface side sheet material 15 to each other, and the laminated member 26 concerned is subjected to the blow molding. In such a way, a shape of the vehicle deck board 1 can be matched with the shapes of the inner surfaces 21a and 22a of the lower and upper dies 21 and 22 more accurately. Moreover, the back surface side sheet material 16 and the front surface side sheet material 15 are molded to the uniform thickness in advance, and in the state where these are arranged in the horizontal direction, the vehicle deck board 1 is molded. Accordingly, the thicknesses of the sheets can be suppressed from varying among regions on front and back surfaces of the vehicle deck board 1, whereby the distortion that may be caused by such variations of the thicknesses of the sheets can be suppressed from occurring, and the front surface and back surface of the vehicle deck board 1 can be suppressed from being locally dented, and so on. As described above, if it becomes possible to reproduce the shapes of the inner surfaces of the metal dies more favorably, then it also becomes possible to mold both of the front and back surfaces of the vehicle deck board 1 into a flat shape, and it becomes possible to obtain a vehicle deck board 1 that is specified to be reversible.

Moreover, in accordance with this embodiment, the foamed resins (height-increasing bridge members) 13 are interposed between the back surface side sheet material 16 and the front surface side sheet material 15, whereby the back surface side sheet material 16 and the front surface side sheet material 15 can be supported by the foamed resins (height-increasing bridge members) 13, and the rigidity of the vehicle deck board 1 can be increased. In addition, at the time of molding the vehicle deck board 1, the vehicle deck board 1 can be further suppressed from being locally dented. Moreover, the thicknesses of the back surface side sheet material 16 and the front surface side sheet material 15 can be thinned in comparison with the case where the foamed resins (height-increasing bridge members) 13 are not interposed therebetween. Accordingly, even if weight of the vehicle deck board 1 is increased by the amount that the foamed resins (height-increasing bridge members) 13 are interposed between these sheet materials, a weight increase of the vehicle deck board 1 can be suppressed by the amount that the back surface side sheet material 16 and the front surface side sheet material 15 are thinned in thickness and reduced in weight. At this time, if a construction of the foamed resins (height-increasing bridge members) 13 is designed as appropriate, then it is also possible to reduce the weight of the vehicle deck board more than heretofore.

Furthermore, in accordance with this embodiment, the reinforcements (reinforcing members) 20 are interposed together with the foamed resins (height-increasing bridge members) 13 between the back surface side sheet material 16 and the front surface side sheet material 15, and accordingly, the rigidity of the vehicle deck board 1 can be further enhanced.

Moreover, in accordance with this embodiment, the nonwoven fabric material 17 is interposed between the upper die 22 and the front surface side sheet material 15, whereby the surface of the vehicle deck board 1 can be covered with the nonwoven fabric material 17, and design of the vehicle deck board 1 can be enhanced.

Moreover, in accordance with this embodiment, the vehicle deck board 1 has a structure, in which the foamed resins (height-increasing bridge members) 13 having high rigidity are used, and the front surface side sheet 12a and the back surface side sheet 12b are supported by the foamed resins (height-increasing bridge members) 13. Accordingly, the rigidity of the vehicle deck board 1 can be enhanced, and the vehicle deck board 1 can be suppressed from being locally dented.

Moreover, in accordance with this embodiment, the vehicle deck board 1 has a structure in which the reinforcements (reinforcing members) 20 are interposed between the front surface side sheet 12a and the back surface side sheet 12b, and accordingly, the rigidity of the vehicle deck board 1 can be further enhanced.

Furthermore, in accordance with this embodiment, the foamed resins (height-increasing bridge members) 13 having the substantial I shape when viewed from the above are used, and each of such protruded portions of the foamed resins 13 are arranged so as to cover at least a part of each of both end sides of the reinforcements 20 in the longitudinal direction. Accordingly, the occurrence of the unusual noise, which may be caused by the fact that the reinforcements 20 move and flatter in the inside of the vehicle deck board 1, can be suppressed. In addition, both end portions of the reinforcements 20 in the longitudinal direction are not completely surrounded by the foamed resins 13. Accordingly, at the time of injecting the compressed air into the inside of the laminated member 26 with the height-increasing bridge members included therein and performing the blow molding therefor, the compressed air can be distributed also to the peripheries of the reinforcements 20, and a partial molding failure can be suppressed from occurring in the vehicle deck board 1.

Moreover, in accordance with this embodiment, the vehicle deck board 1 has a structure in which the coated portion obtained by coating the surface of the front surface side sheet 12a with the nonwoven fabric 14 is formed, and accordingly, the design of the vehicle deck board 1 can be enhanced.

Next, a description will be made of modification examples of the above-described embodiment.

First Modification Example

Figure 6:
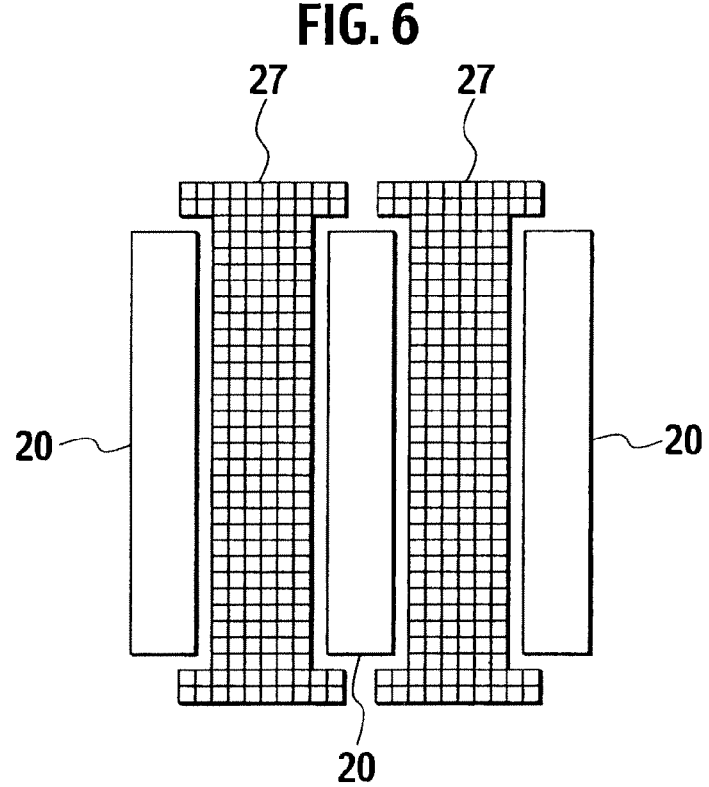
FIG. 6 is a plan view showing a state where grid-like structure molded bodies and the reinforcements are arranged on the back surface side sheet material according to a first modification example of the present invention.
Figure 7:
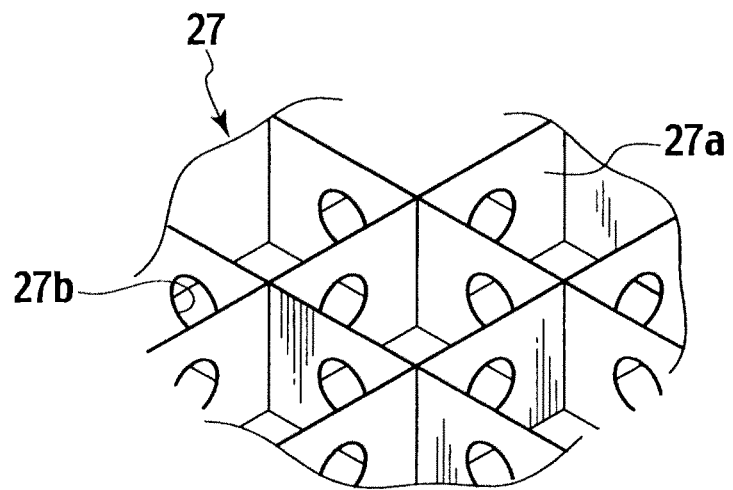
FIG. 7 is a perspective view of the grid-like structure molded body according to the first modification example of the present invention.
Figure 8:
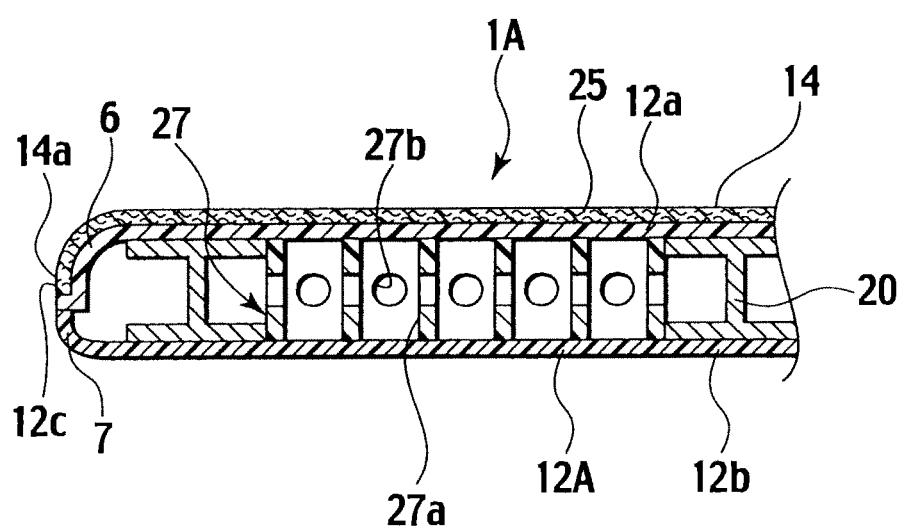
FIG. 8 is a cross-sectional view of a vehicle deck board according to the first modification example of the present invention.

FIG. 6 is a plan view showing a state where grid-like structure molded bodies and the reinforcements are arranged on the back surface side sheet material according to a first modification example of this embodiment, FIG. 7 is a perspective view of the grid-like structure molded body according to the first modification example, and FIG. 8 is a cross-sectional view of a vehicle deck board according to the first modification example. Note that this modification example includes similar constituents to those of the above-mentioned first embodiment. Hence, common reference numerals are assigned to these similar constituents, and a duplicate description will be omitted.

In the vehicle deck board 1A according to this modification example, instead of the foamed resins 13 of the above-mentioned embodiment, grid-like structure molded bodies 27 having longitudinal wall portions 27a as shown in FIG. 7 are used as the height-increasing bridge members. Each of these grid-like structure molded bodies 27 has a substantial I shape when viewed from the above, and in each of the longitudinal wall portions 27a of the grid-like structure molded body 27, an air hole 27b is formed so as to allow the respective rooms partitioned in a grid fashion to communicate with each other.

Then, in this embodiment, the grid-like structure molded bodies 27 are formed by using filler-reinforced polypropylene obtained by blending filler into polypropylene resin (synthetic resin material). Note that it is also possible to form the grid-like structure molded bodies by using another synthetic resin material, a synthetic resin foamed material, a metal material or a paper material.

Moreover, these grid-like structure molded bodies 27 are formed by punch press molding or injection molding.

Then, in a similar way to the above-mentioned first embodiment, the grid-like structure molded bodies 27 and the reinforcements 20 are arranged alternately as shown in FIG. 6, and are interposed between the front surface side sheet material 15 and the back surface side sheet material 16, and the nonwoven fabric material (other-side coating material) 17 is arranged on the front surface side sheet material 15. In this state, while individually vacuum-sucking the front surface side sheet material 15, the nonwoven fabric material 17 and the back surface side sheet material 16 to the upper die 22 and the lower die 21, the upper and lower dies 22 and 21 are clamped together, the compressed air is injected into the inside of the laminated member 26 with the height-increasing bridge members included therein, which is formed by such die clamping, and the laminated member 26 concerned is subjected to the blow molding, whereby a hollow molded body (hollow laminated plate with the height-increasing bridge members included therein) 12A with the height-increasing bridge members included therein, which is as shown in FIG. 8, is formed.

Also in accordance with this modification example described above, similar effects to those of the above-mentioned first embodiment can be obtained.

Moreover, in accordance with this modification example, the grid-like structure molded bodies 27 molded of the synthetic resin material are used as the height-increasing bridge members, whereby rigidity of the vehicle deck board 1 can be enhanced, and in addition, weight reduction of the vehicle deck board 1A can be achieved. Note that, even if the grid-like structure molded bodies are molded by using the other synthetic resin material, the synthetic resin foamed material, the metal material, the paper material or the like, substantially similar effects can be obtained.

Furthermore, the air holes are formed in the longitudinal wall portions 27a of the grid-like structure molded bodies 27. In such a way, at the time of injecting the compressed air into the inside of the laminated member 26 with the height-increasing bridge members included therein, the compressed air is distributed also into the respective rooms surrounded by the longitudinal wall portions 27a of the grid-like structure molded bodies 27, and the partial molding failure can be suppressed from occurring in the vehicle deck board 1A.

Moreover, in accordance with this modification example, the punch press molding or the injection molding is performed for the synthetic resin material, whereby the grid-like structure molded bodies 27 having the longitudinal wall portions 27a, in which the air holes 27b are formed in the longitudinal wall portions 27a, can be molded easily.

Second Modification Example

Figure 9:
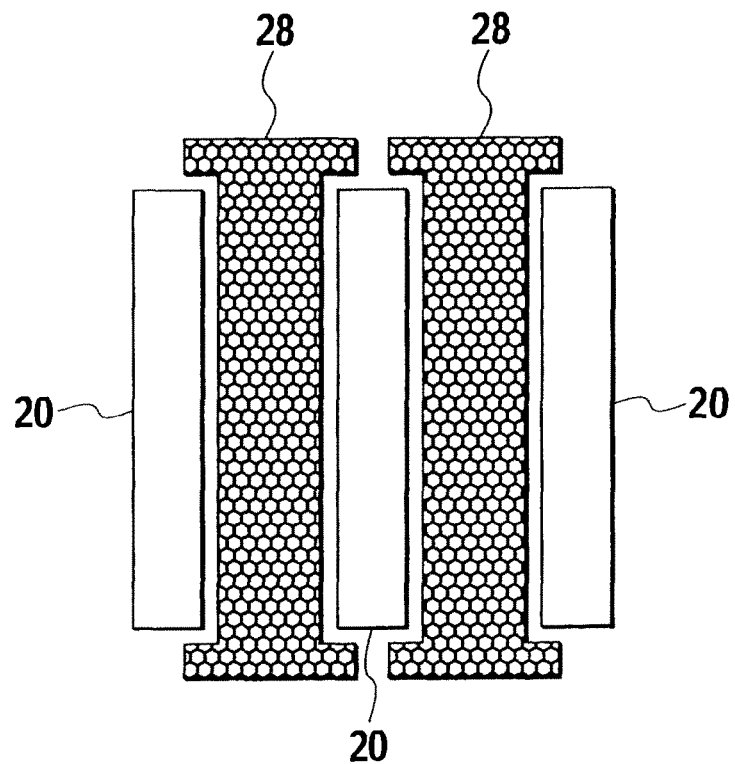
FIG. 9 is a plan view showing a state where honeycomb structure molded bodies and the reinforcements are arranged on the back surface side sheet material according to a second modification example of the present invention.
Figure 10:
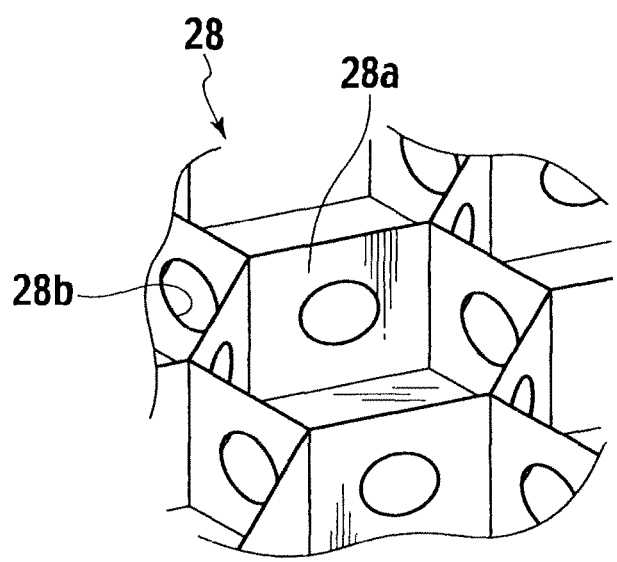
FIG. 10 is a perspective view of the honeycomb structure molded body according to the second modification example of the present invention.
Figure 11:
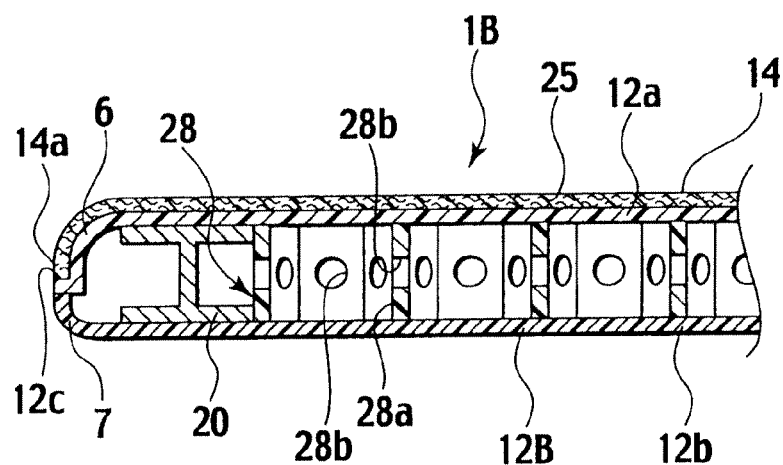
FIG. 11 is a cross-sectional view of a vehicle deck board according to the second modification example of the present invention.

FIG. 9 is a plan view showing a state where honeycomb structure molded bodies and the reinforcements are arranged on the back surface side sheet material according to a second modification example of this embodiment, FIG. 10 is a perspective view of the honeycomb structure molded body according to the second modification example, and FIG. 11 is a cross-sectional view of a vehicle deck board according to the second modification example. Note that this modification example includes similar constituents to those of the above-mentioned first embodiment. Hence, common reference numerals are assigned to these similar constituents, and a duplicate description will be omitted.

In the vehicle deck board 1B according to this modification example, instead of the foamed resins 13 of the above-mentioned embodiment, hexagonal honeycomb structure molded bodies 28 having longitudinal wall portions 28A as shown in FIG. 10 are used as the height-increasing bridge members. Each of these honeycomb structure molded bodies 28 has a substantial I shape when viewed from the above, and in each of the longitudinal wall portions 28a of the honeycomb structure molded body 28, an air hole 28b is formed so as to allow the respective rooms partitioned into a hexagonal shape to communicate with each other. Note that such a honeycomb structure is not limited to the hexagonal shape, and it is also possible to use an octagonal honeycomb shape.

Then, in this embodiment, in a similar way to the above-mentioned first modification example, the honeycomb structure molded bodies 28 are formed by using the filler-reinforced polypropylene obtained by blending the filler into the polypropylene resin (synthetic resin material). Note that it is also possible to form the honeycomb structure molded bodies 28 by using the other synthetic resin material, the synthetic resin foamed material, the metal material or the paper material.

Moreover, these honeycomb structure molded bodies 28 are formed by the punch press molding or the injection molding.

Then, in a similar way to the above-mentioned first embodiment, the honeycomb structure molded bodies 28 and the reinforcements 20 are arranged alternately as shown in FIG. 9, and are interposed between the front surface side sheet material 15 and the back surface side sheet material 16, and the nonwoven fabric material (other-side coating material) 17 is arranged on the front surface side sheet material 15. In this state, while individually vacuum-sucking the front surface side sheet material 15, the nonwoven fabric material 17 and the back surface side sheet material 16 to the upper die 22 and the lower die 21, the upper and lower dies 22 and 21 are clamped together, the compressed air is injected into the inside of the laminated member 26 with the height-increasing bridge members included therein, which is formed by such die clamping, and the laminated member 26 concerned is subjected to the blow molding, whereby a hollow molded body (hollow laminated plate with the height-increasing bridge members included therein) 12B with the height-increasing bridge members included therein, which is as shown in FIG. 11, is formed.

Also in accordance with this modification example described above, similar effects to those of the above-mentioned first embodiment and first modification example can be obtained.

Third Modification Example

Figure 12:
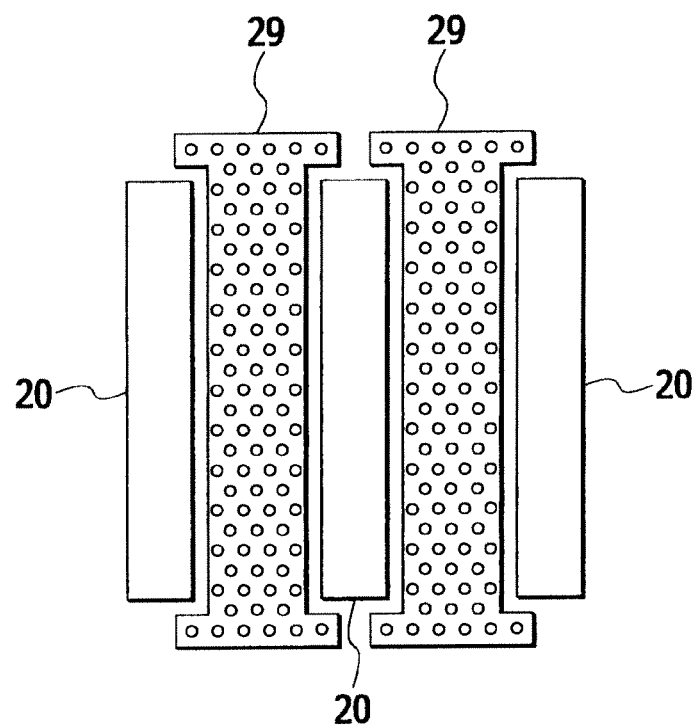
FIG. 12 is a plan view showing a state where embossed shaped molded bodies and the reinforcements are arranged on the back surface side sheet material according to a third modification example of the present invention.
Figure 13:
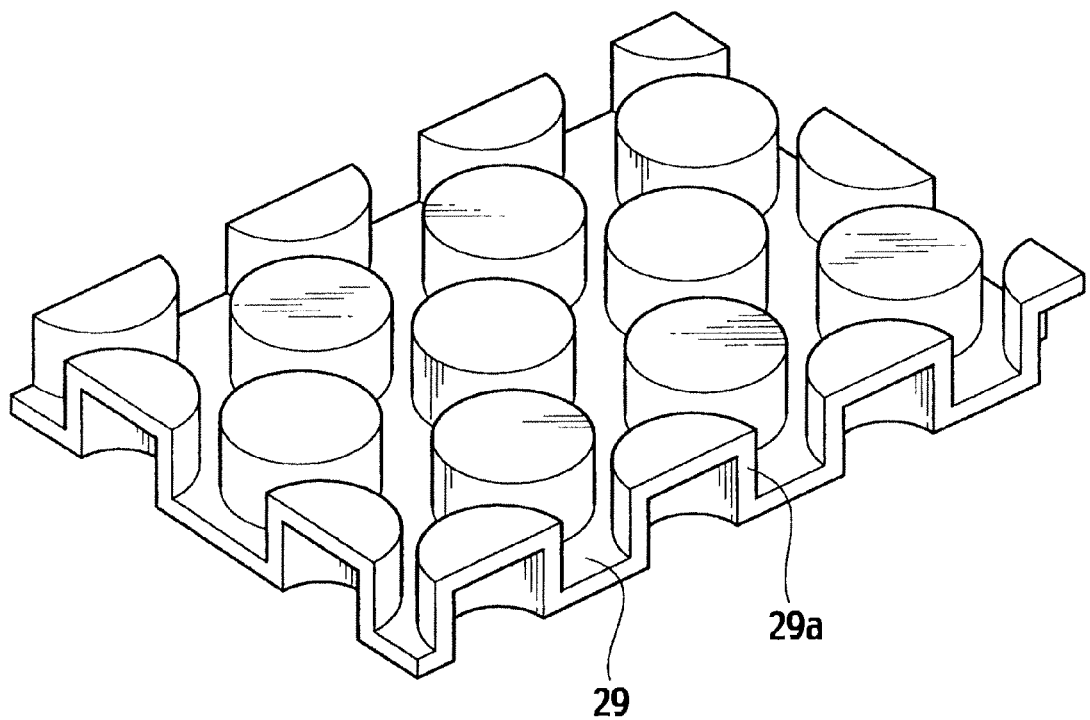
FIG. 13 is a perspective view of the embossed shaped molded body according to the third modification example of the present invention.
Figure 14:
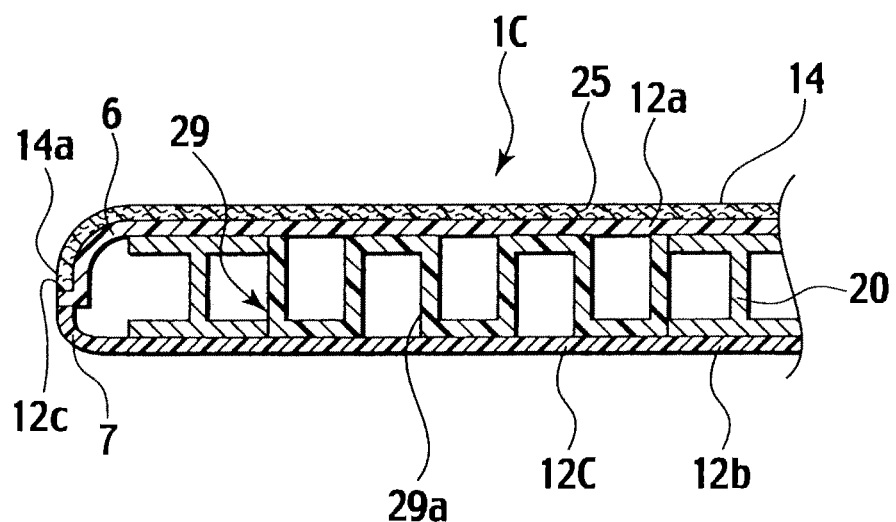
FIG. 14 is a cross-sectional view of a vehicle deck board according to the third modification example of the present invention.

FIG. 12 is a plan view showing a state where embossed shaped molded bodies and the reinforcements are arranged on the back surface side sheet material according to a third modification example of this embodiment, FIG. 13 is a perspective view of the embossed shaped molded body according to the third modification example, and FIG. 14 is a cross-sectional view of a vehicle deck board according to the third modification example. Note that this modification example includes similar constituents to those of the above-mentioned first embodiment. Hence, common reference numerals are assigned to these similar constituents, and a duplicate description will be omitted.

In the vehicle deck board 1C according to this modification example, instead of the foamed resins 13 of the above-mentioned embodiment, embossed shaped molded bodies 29 having longitudinal wall portions 29a as shown in FIG. 13, that is, embossed shaped molded bodies 29 uneven in cross section, which have columnar embossments, are used as the height-increasing bridge members. Each of these embossed shaped molded bodies 29 has a substantial I shape when viewed from the above.

Then, in this embodiment, in a similar way to the above-mentioned first modification example, the embossed shaped molded bodies 29 are formed by using the filler-reinforced polypropylene obtained by blending the filler into the polypropylene resin (synthetic resin material). Note that it is also possible to form the embossed shaped molded bodies by using the other synthetic resin material, the synthetic resin foamed material or the metal material.

Then, in a similar way to the above-mentioned first embodiment, the embossed shaped molded bodies 29 and the reinforcements 20 are arranged alternately as shown in FIG. 12, and are interposed between the front surface side sheet material 15 and the back surface side sheet material 16, and the nonwoven fabric material (other-side coating material) 17 is arranged on the front surface side sheet material 15. In this state, while individually vacuum-sucking the front surface side sheet material 15, the nonwoven fabric material 17 and the back surface side sheet material 16 to the upper die 22 and the lower die 21, the upper and lower dies 22 and 21 are clamped together, the compressed air is injected into the inside of the laminated member 26 with the height-increasing bridge members included therein, which is formed by such die clamping, and the laminated member 26 concerned is subjected to the blow molding, whereby a hollow molded body (hollow laminated plate with the height-increasing bridge members included therein) 12C with the height-increasing bridge members included therein, which is as shown in FIG. 14, is formed.

Also in accordance with this modification example described above, similar effects to those of the above-mentioned first embodiment can be obtained.

Moreover, in accordance with this modification example, the embossed shaped molded bodies 29 molded of the synthetic resin material, which have been heretofore used as heat insulation panels for a building or automotive interior components, are used as the height-increasing bridge members, whereby rigidity of the vehicle deck board 1C can be enhanced, and in addition, a thickness of the vehicle deck board 1C can be thinned more than heretofore, thus making it possible to achieve weight reduction of the vehicle deck board 1C. Note that, even if the embossed shaped molded bodies are molded by using the other synthetic resin material, the synthetic resin foamed material or the metal material, substantially similar effects can be obtained.

Furthermore, in the case where the embossed shaped molded bodies 29 are used as in this modification example, the compressed air can be distributed to the inside of the laminated member 26 with the height-increasing bridge members included therein even if the air holes for distributing the compressed air are not provided as in the above-mentioned first and second modification examples.

Fourth Modification Example

Figure 15:
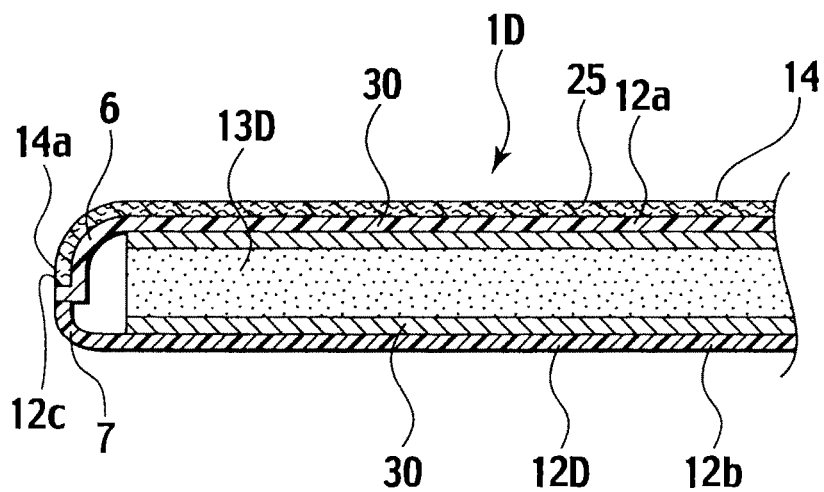
FIG. 15 is a cross-sectional view of a vehicle deck board according to a fourth modification example of the present invention.

FIG. 15 is a cross-sectional view of a vehicle deck board according to a fourth modification example of this embodiment. Note that this modification example includes similar constituents to those of the above-mentioned first embodiment. Hence, common reference numerals are assigned to these similar constituents, and a duplicate description will be omitted.

In the vehicle deck board 1D according to this modification example, instead of the foamed resins 13 of the above-mentioned embodiment, a molded body (molded body obtained by laminating a synthetic resin sheet or a synthetic resin foamed sheet between two upper and lower metal plates) obtained by laminating two metal plates 30 and 30 on and under a polypropylene-made plate-like foamed resin (synthetic resin foamed sheet) 13D is used as the height-increasing bridge members. Note that it is also possible to use another synthetic resin foamed sheet or synthetic resin sheet instead of the polypropylene-made foamed resin.

Moreover, in this modification example, the reinforcements 20 are not used.

Then, the molded body obtained by laminating the two metal plates 30 and 30 on and under the foamed resin 13D is interposed between the front surface side sheet material 15 and the back surface side sheet material 16, and in a similar way to the above-mentioned first embodiment, the nonwoven fabric material (other-side coating material) 17 is arranged on the front surface side sheet material 15. In this state, while individually vacuum-sucking the front surface side sheet material 15, the nonwoven fabric material 17 and the back surface side sheet material 16 to the upper die 22 and the lower die 21, the upper and lower dies 22 and 21 are clamped together, the compressed air is injected into the inside of the laminated member 26 with the height-increasing bridge members included therein, which is formed by such die clamping, and the laminated member 26 concerned is subjected to the blow molding, whereby a hollow molded body (hollow laminated plate with the height-increasing bridge members included therein) 12D with the height-increasing bridge members included therein, which is as shown in FIG. 15, is formed.

Also in accordance with this modification example described above, similar effects to those of the above-mentioned first embodiment can be obtained.

Moreover, in accordance with this modification example, the molded body obtained by laminating the two metal plates 30 and 30 on and under the foamed resin 13D is used, and accordingly, rigidity of the vehicle deck board 1D can be enhanced even if the reinforcing members are not used. Note that, even if the other synthetic resin foamed sheet or the synthetic resin sheet is used, substantially similar effects can be obtained.

The description has been made above of the preferred embodiment of the present invention; however, the present invention is not limited to the above-mentioned embodiment, and a variety of modifications are possible.

For example, in the embodiment and the first to fourth modification examples, which are mentioned above, illustrated as the height-increasing bridge members are: the thermoplastic resin-foamed molded bodies; the molded body obtained by laminating the synthetic resin sheet or the synthetic resin foamed sheet between the two upper and lower metal plates; the embossed shaped molded bodies having the longitudinal wall portions; the honeycomb structure molded body having the longitudinal wall portions, in which the air holes are formed in the longitudinal wall portions; and the grid-like structure molded bodies having the longitudinal wall portions, in which the air holes are formed in the longitudinal wall portions. However, the present invention can be embodied even if chip urethane resin molded bodies, chip felt molded bodies, corrugated cardboard molded bodies and the like are used. Note that, at the time of using the corrugated cardboard molded bodies, it is suitable to use those having heat resistance.

Moreover, in the embodiment and the first to fourth modification examples, which are mentioned above, such two plate portions having the same thickness are used; however, the thicknesses of the two plate portions may be allowed to differ from each other.

In such a way, strengths of the two plate portions can be changed. For example, the strength of the front surface side is necessary, whereas the plate portion to be used for the back surface side can be thinned and reduced in weight in the case where the strength is not required for the back surface side very much.

Furthermore, in the embodiment and the first to fourth modification examples, which are mentioned above, those in which blended amounts of the filler into the polypropylene are the same are used as the two plate portions; however, those in which types of the filler and the glass long fiber are different therebetween or blended amounts of the filler and the glass long fiber are different therebetween may be used as the two plate portions.

In such a way, heat resistance and impact resistance of the plate portions can be enhanced. Moreover, the two plate portions can be thinned more, and weight reduction of the hollow laminated plate can be achieved. Furthermore, at least either the filler or the glass long fiber is blended into the polypropylene resin, whereby shrinkage of the polypropylene resin, which occurs at the time of molding the hollow laminated plate, can be reduced, and deformation of the hollow laminated plate, such as the distortion thereof, can be suppressed.

Moreover, the cross sections of the reinforcing members are not limited to the H shape, and may be perfect circles, ellipsoids, quadrangles and the like. Then, it is also possible to use not only the metal-made extrusion-molded products but also synthetic resin-made extrusion molded products or resin-made press-molded products.

Furthermore, in the above-mentioned first and second modification examples, the air hole is provided in a center portion of each of the longitudinal wall portions; however, a provided position of the air hole is not limited to this, and the air hole can be provided at various positions. For example, a part of an upper end portion of each of the longitudinal wall portions is notched into a slit shape, whereby the air hole may be formed.

Moreover, as the embossed shaped molded bodies of the above-mentioned third modification example, it is suitable to use those in which the thickness is 3 mm to 12 mm.

In such a way, further weight reduction of the vehicle deck board can be achieved.

Moreover, in each of the embodiment and the modification examples, which are mentioned above, one plate-like vehicle deck board is illustrated; however, the present invention can be embodied even if a vehicle deck board is used, in which a plurality of boards are integrally and continuously provided while interposing hinge portions therebetween in such a manner that a pair of metal dies are used, and at the time of forming the vehicle deck board, two thermoplastic resin materials are thermally welded to each other by being pressed by pressing members provided in the metal dies in advance, and the hinge portions are thereby formed.

Note that, in the above-mentioned embodiment, the vehicle deck board is illustrated as the laminated plate; however, the present invention can be embodied even if other interior or exterior materials for the vehicle or the building are used.

INDUSTRIAL APPLICABILITY

In accordance with the present invention, it is possible to obtain a laminated plate that is capable of enhancing strength thereof, and in addition, is capable of suppressing an occurrence of distortion after being molded regardless of a size thereof, and to obtain a manufacturing method thereof.

The invention claimed is:

1. A laminated plate, comprising:
a first plate portion having a first end portion and a second plate portion having a second end portion, the first and second plate portions being made of thermoplastic resin; and
a plurality of height-increasing bridge members having a substantial I-shape when viewed from above and interposed between the first and second plate portions;
wherein the first and second end portions are welded to each other,
wherein the height-increasing bridge members are embossed shaped molded bodies having at least one longitudinal wall portion,
wherein a plurality of reinforcing members are interposed between the first and second plate portions, and a part of the height-increasing bridge member on at least one side of each of the plurality of reinforcing members protrudes so as to cover at least a part of each of both end sides of the reinforcing members in a longitudinal direction, and both end sides of the reinforcing members in the longitudinal direction are not completely surrounded by the height-increasing bridge members,
wherein the laminated plate is configured as an interior portion for a vehicle, and
wherein the reinforcing members have a rectangular shape when viewed from above.

2. The laminated plate according to claim 1, wherein a synthetic resin material or a synthetic resin foamed material is used as the embossed shaped molded body.

3. The laminated plate according to claim 1, wherein the reinforcing members comprise at least one of a metal-made extrusion molded product, a synthetic resin-made extrusion molded product and a resin-made press-molded product.

4. The laminated plate according to claim 1, wherein the first and second plate portions are formed of a material obtained by blending at least either one of filler and glass long fiber to polypropylene resin, and the first and second plate portions are different from each other in at least one of a type of the filler, a blended amount of the filler, a length of the glass long fiber, and a blended amount of the glass long fiber.

5. The laminated plate according to claim 1, wherein a portion of an outer surface of at least one of the first and second plate portions is coated with a coating material.

6. A laminated plate, comprising:
a first plate portion having a first end portion and a second plate portion having a second end portion, the first and second plate portions being made of thermoplastic resin; and
a plurality of height-increasing bridge members having a substantial I-shape when viewed from above and interposed between the first and second plate portions;
wherein the first and second end portions are welded to each other,
wherein the height-increasing bridge members are honeycomb structure molded bodies having at least one longitudinal wall portion, in which at least one air hole is formed,
wherein a plurality of reinforcing members are interposed between the first and second plate portions, and a part of the height-increasing bridge member on at least one side of each of the plurality of reinforcing members protrudes so as to cover at least a part of each of both end sides of the reinforcing members in a longitudinal direction, and both end sides of the reinforcing members in the longitudinal direction are not completely surrounded by the height-increasing bridge members,
wherein the laminated plate is configured as an interior portion for a vehicle, and
wherein the reinforcing members have a rectangular shape when viewed from above.

7. The laminated plate according to claim 6, wherein a synthetic resin material or a synthetic resin foamed material is used as the honeycomb structure molded body.

8. The laminated plate according to claim 6, wherein any of a synthetic resin material and a synthetic resin foamed material, which are subjected to punch press molding, and a synthetic resin material and a synthetic resin foamed material, which are subjected to injection molding, is used as the honeycomb structure molded body.

9. The laminated plate according to claim 6, wherein the reinforcing members comprise at least one of a metal-made extrusion molded product, a synthetic resin-made extrusion molded product and a resin-made press-molded product.

10. The laminated plate according to claim 6, wherein the first and second plate portions are formed of a material obtained by blending at least either one of filler and glass long fiber to polypropylene resin, and the first and second plate portions are different from each other in at least one of a type of the filler, a blended amount of the filler, a length of the glass long fiber, and a blended amount of the glass long fiber.

11. The laminated plate according to claim 6, wherein a portion of an outer surface of at least one of the first and second plate portions is coated with a coating material.

12. A laminated plate, comprising:
a first plate portion having a first end portion and a second plate portion having a second end portion, the first and second plate portions being made of thermoplastic resin; and
a plurality of height-increasing bridge members having a substantial I-shape when viewed from above and interposed between the first and second plate portions;
wherein the first and second end portions are welded to each other,
wherein the height-increasing bridge members are one of (1) honeycomb structure molded bodies having at least one longitudinal wall portion, in which at least one air hole is formed and (2) embossed shaped molded bodies having at least one longitudinal wall portion, wherein a plurality of reinforcing members are interposed between the first and second plate portions, and a part of the height-increasing bridge member on at least one side of each of the plurality of reinforcing members protrudes so as to cover at least a part of each of both end sides of the reinforcing members in a longitudinal direction, and both end sides of the reinforcing members in the longitudinal direction are not completely surrounded by the height-increasing bridge members, wherein the laminated plate is configured as an interior portion for a vehicle, and wherein the reinforcing members have a rectangular shape when viewed from above.

13. The laminated plate according to claim 12, wherein the reinforcing members comprise at least one of a metal-made extrusion molded product, a synthetic resin-made extrusion molded product and a resin-made press-molded product.

14. The laminated plate according to claim 12, wherein the first and second plate portions are formed of a material obtained by blending at least either one of filler and glass long fiber to polypropylene resin, and the first and second plate portions are different from each other in at least one of a type of the filler, a blended amount of the filler, a length of the glass long fiber, and a blended amount of the glass long fiber.

15. The laminated plate according to claim 12, wherein a portion of an outer surface of at least one of the first and second plate portions is coated with a coating material.

* * * * *